E. R. McCREARY.
WATER MOTOR.
APPLICATION FILED OCT. 11, 1909.
972,010.
Patented Oct. 4, 1910.
2 SHEETS—SHEET 1.
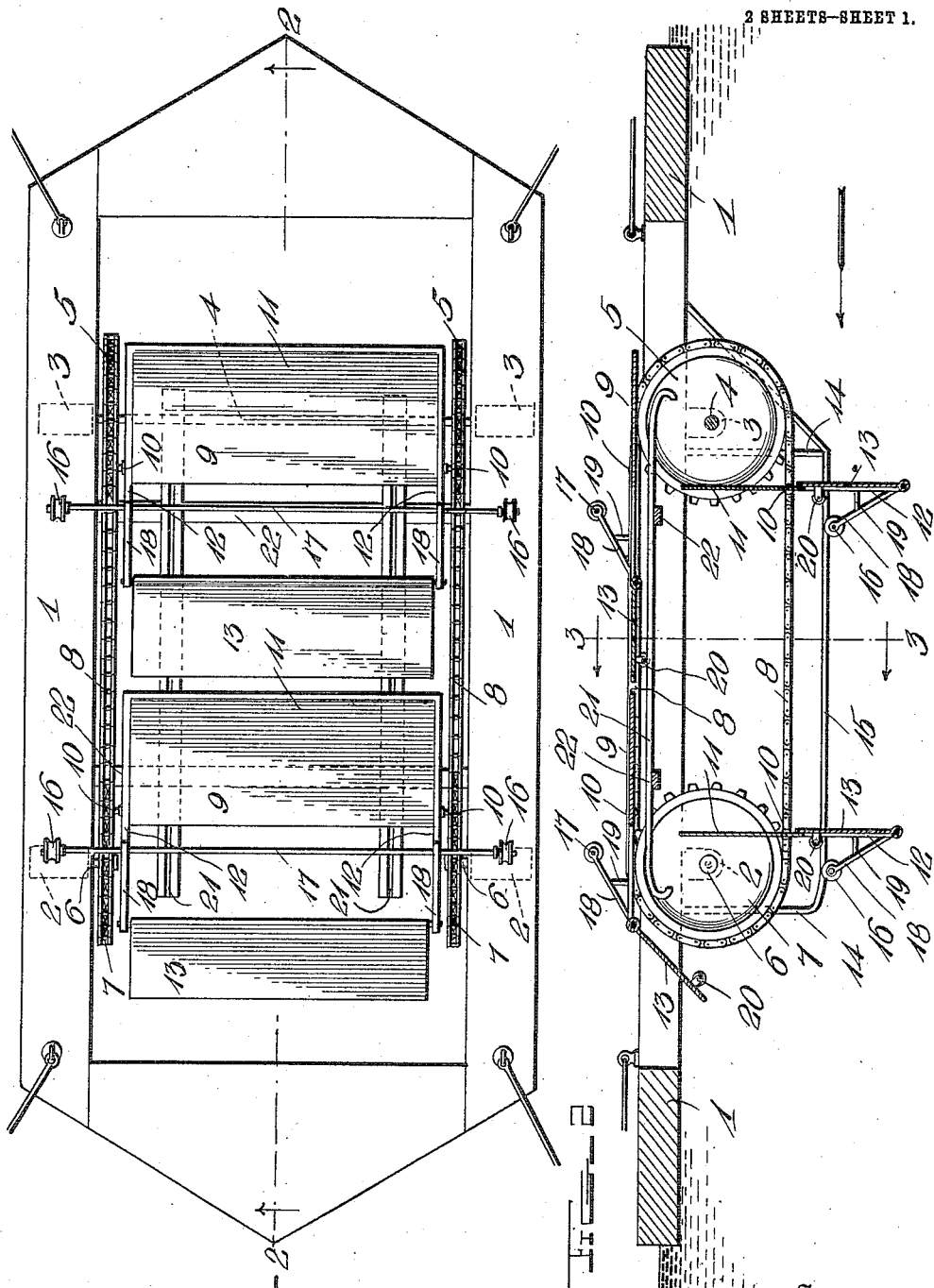
Witnesses
Inventor
Elijah R. McCreary
by H. B. Willson & Co.
Attorneys

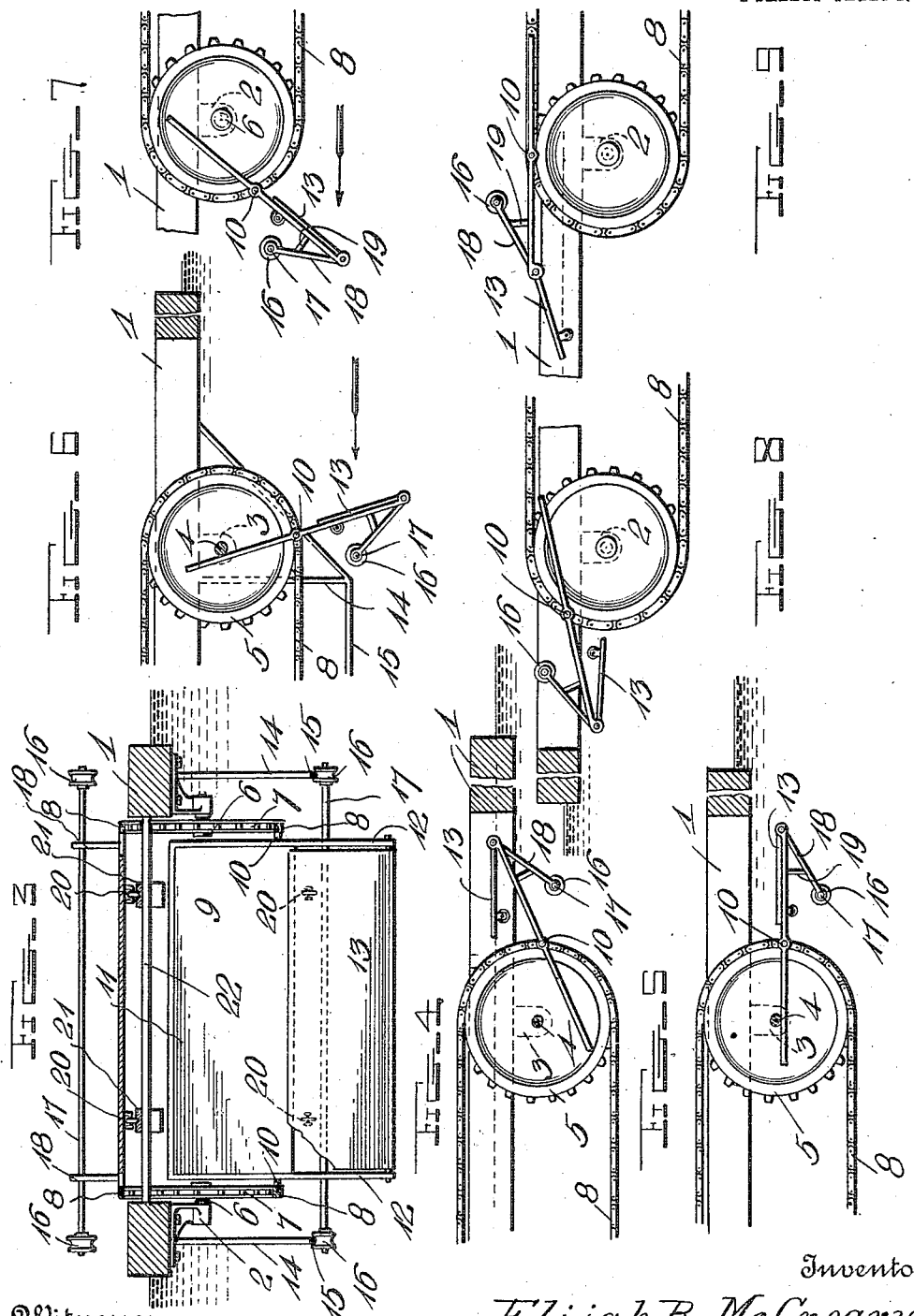

UNITED STATES PATENT OFFICE.

ELIJAH R. McCREARY, OF BUSH, LOUISIANA.

WATER-MOTOR.

972,010.  Specification of Letters Patent.  Patented Oct. 4, 1910.

Application filed October 11, 1909. Serial No. 522,025.

*To all whom it may concern:*

Be it known that I, ELIJAH R. MCCREARY, a citizen of the United States, residing at Bush, in the parish of St. Tammany and State of Louisiana, have invented certain new and useful Improvements in Water-Motors; and I do declare the following to be a full, clear, and exact description of the invention, such as will enable others skilled in the art to which it appertains to make and use the same.

My invention relates to water motors.

One object of the invention is the provision of a device of this character which has its blades or paddles so arranged that the maximum effect of the water may be obtained throughout the power course of the paddles and their retarding effect throughout the idle course will be negligible.

A further object of the invention is the provision of a novel paddle for water motors which has one end thereof made heavier than the opposite end whereby its proper position is positively assured for the power course, a still further object being to provide the heavier end of the paddles with hinged doors which, upon the idle course of the paddle, lies flat upon the conveyer chain in a direction parallel with the water line so that upon leaving the water it exerts no retarding effect upon the chains.

With the foregoing and other objects in view, the invention consists of certain novel features of construction, combination and arrangement of parts, as will be more fully described and particularly pointed out in the appended claims.

In the accompanying drawings, Figure 1 is a top plan view; Fig. 2 is a side elevation with parts broken away; Fig. 3 is a vertical section taken on the line 3—3 of Fig. 2; Figs. 4, 5, 6, 7, 8 and 9 are detail diagrammatic illustrations showing the different positions.

Referring more especially to the drawings, 1 represents an oblong rectangular frame having a pointed guard or fender connected to its upper end whereby the debris and other foreign matter may be warded off from the mechanism. This frame is adapted to float upon the water and is held in position within the current by guy ropes or in any other suitable manner. Intermediate the length of the frame and separated suitable distances apart are bearing blocks 2 and 3, carried upon the underneath side of the frame. The forward bearing blocks 3 are adapted to receive the transverse shaft 4 upon which the sprocket wheels 5 are mounted, and the rear bearing blocks 2 have mounted therein stub shafts 6 upon which the sprocket wheels 7 are mounted. Over these sprocket wheels travel suitable chains 8 upon which the paddles 9 are carried. The upper stretch of chains is preferably approximately flush with the upper edge of the floating frame and the lower stretch of the chains is considerably below the water level and carries the paddles sufficiently far below the water so that their upper edge is slightly below the water level. The paddles are pivoted intermediate their width, as at 10, to the chains and have their upper portion 11 constructed so that no water may pass therethrough. The lower portion 12 of the paddles is constructed in the form of a frame and has hinged to its lower edge a door 13 which folds and unfolds as will hereinafter be described.

In order to hold the paddles in perpendicular position whereby the strength of the current will exert its maximum pressure thereupon above and below the pivotal points of the paddles, I provide a depending skeleton frame 14 to which is connected the guide bars 15 extending along either side of the frame and some distance outside of the wheels 5 and 7, as shown in Fig. 3. These rods are adapted to be engaged by friction rollers 16 carried upon the outer ends of the rods 17 which are held in proper position by the diagonal braces 18. These braces 18 extend up from the lower end of the frame portion 12 of the paddles and are held in proper position by the struts 19. When the rollers 16 engage the bars 15, as shown in Fig. 2, the force of the water exerted upon the paddles holds them vertically and at right angles to the force of the stream. Each door 13 is provided with friction rollers 20 which are arranged on either side and adapted to engage the upper edge of tracks 21 so that the doors will be supported in horizontal position. In this position, the weight of the doors 13 holds the upper imperforate end 11 horizontally with the conveyer chains 8.

In the operation of the device, we will assume that there is only two blades or paddles connected to the chain and that one of them is lying in its horizontal position upon the idle course of the chain. The water acting upon the blade which is submerged moves the idle course of the chains with its idle paddle forward until the unsupported end 11 of the paddle 9 is carried downwardly by reason of the pivotal point 10 passing around the sprocket wheel. At the time the water engages the light end 11, the upper end 12 is the heavier end and the door 13 starts to drop as shown, falling upon the water, when in the position shown in Fig. 4. A further movement of the chain brings the paddle with its light end 11 against the shaft 4 where it remains until the pivotal point 10 passes the point directly beneath said shaft. In Fig. 6, a still further position is shown wherein the rollers 16 are about to engage the guide tracks 15, so as to hold the paddles in vertical position. Fig. 2 shows the paddles in their active course. The impress of the current against the door 13 is sufficient during the active course of the paddle to hold the door in closed position. After the rollers 16 reach the end of the guide tracks 15, the paddles begin their ascent on the lower sprocket wheels and as the rollers 16 are free the current forces the paddles to the position shown in Fig. 7. When they attain the position shown in Fig. 8, the impress of the water against the door 13 is insufficient to hold it in place and it drops gradually as shown in Figs. 8 and 9, until the rollers 20 engage the track ways 21 which are supported upon the brace timbers 22 bridged between the sidepieces of the frame 1.

It will be noticed that very little wear is caused upon the rollers 16 or the track 15 as the action upon the paddles is practically balanced by reason of the fact that substantially one-half of the paddle is arranged on one side of the sprocket chain and the opposite half is arranged on the opposite side of the chain. The rollers 16 are maintained in contact with the tracks only by reason of the fact that the current below the surface is usually somewhat stronger than upon the surface.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a water motor, a floating frame, a pair of endless belts mounted to operate in the frame, paddles journaled to said belts and between the same, pressure tracks depending from the frame, brackets carried by the paddles and adapted to engage the tracks to hold the paddles transverse to the current, supporting tracks carried by the frame, and means carried by the paddles for holding them in line with the current in their inactive course.

2. In a water motor, a floating frame, a pair of endless belts mounted therein, paddles journaled to and lying between said belts, pressure tracks depending from said frame, brackets carried by said paddles and adapted to engage the tracks to hold the paddles transverse to the current during their active course, doors pivoted to the paddles, supporting tracks carried by the frame adapted to support the paddles in line with the current during their inactive course, and friction rollers carried by the doors and adapted to engage the tracks to support the doors in line with the paddles.

In testimony whereof I have hereunto set my hand in presence of two subscribing witnesses.

E. R. McCREARY.

Witnesses:
GORDON W. GOODBEE,
W. E. VAMADE.